(12) United States Patent
Chang

(10) Patent No.: US 6,473,629 B1
(45) Date of Patent: Oct. 29, 2002

(54) METHOD OF DISPLAYING ALTERNATING TRANSMITTING AND RECEIVING PHASES OF VOICE COMMUNICATION IN A MOBILE PHONE IN A SPEAKERPHONE MODE

(75) Inventor: Yun-Seok Chang, Kumi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/482,988

(22) Filed: Jan. 12, 2000

(30) Foreign Application Priority Data

Mar. 30, 1999 (KR) .......................................... 99-12702

(51) Int. Cl.$^7$ .......................... H04B 1/38; H04B 17/00; H04M 9/00
(52) U.S. Cl. ....................... 455/566; 455/67.7; 455/550; 455/569; 455/575; 379/388.02; 379/388.04; 379/388.05; 379/388.06; 379/433.01; 379/433.02; 379/433.03; 379/433.04
(58) Field of Search ........................... 455/145, 90, 550, 455/566, 575, 74, 67.7, 82, 569, 570, 563, 567, 568, 552; 379/433.01–433.04, 388.02–388.06

(56) References Cited

U.S. PATENT DOCUMENTS

| | | | | |
|---|---|---|---|---|
| 5,903,632 A | * | 5/1999 | Brandon | 379/93.23 |
| 6,154,639 A | * | 11/2000 | Kanazumi et al. | 455/74 |
| 6,236,443 B1 | * | 5/2001 | Carlsen | 349/143 |

* cited by examiner

*Primary Examiner*—Edward F. Urban
*Assistant Examiner*—Meless Zewdu
(74) *Attorney, Agent, or Firm*—Dilworth & Barrese, LLP

(57) ABSTRACT

A method of displaying alternating transmitting and receiving phases of voice communication in a mobile phone with a display when it is operated in the speakerphone mode includes the steps of comparing the intensity of a received voice signal from a caller with that of a transmitted voice signal, outputting the received voice signal through the speaker of the mobile phone while displaying a visual indication representing the receiving phase on the display if the intensity of the received voice signal is stronger than that of the transmitted voice signal, and sending the transmitted voice signal to the caller while displaying a visual indication representing the transmitting phase on the display if the intensity of the received voice signal is weaker than that of the transmitted voice signal.

3 Claims, 4 Drawing Sheets

COMMUNICATION  TIME
00:59

02-123-4567

METHOD OF DISPLAYING ALTERNATING TRANSMITTING AND RECEIVING PHASES OF VOICE COMMUNICATION IN A MOBILE PHONE IN A SPEAKERPHONE MODE

BACKGROUND OF THE INVENTION

1. Field of the Invention

The present invention relates to a mobile phone, and more particularly to a method of displaying alternating transmitting and receiving phases of voice communication in a mobile phone when it is operated in a speakerphone mode.

2. Description of the Related Art

Continuing improvements in mobile phone technology have led to a more compact mobile phone. In addition, many mobile phones now offer a speakerphone mode. Conventionally, when the mobile phone is operated in the speakerphone mode, the transmitting and receiving phases of voice communication are alternated. More particularly, the communication is one-way at any given time and alternates according to the intensity of a mobile phone user's voice signal. The mobile phone user's voice signal is transmitted only when the intensity exceeds the called party's voice signal. Using this conventional method, a mobile phone user can only verify that his voice signal was transmitted by evaluating the called party's response.

SUMMARY OF THE INVENTION

It is therefore an object of the present invention to provide a method of displaying a visual indication of alternating transmitting and receiving phases of voice communication in a mobile phone in speakerphone mode.

According to an aspect of the present invention, a method of displaying a visual indication of alternating transmitting and receiving phases of voice communication in a mobile phone when it is operated in the speakerphone mode, comprises the steps of comparing the intensity of a received voice signal from a caller with that of a transmitted voice signal of a user, outputting the received voice signal through the speaker of the mobile phone while displaying a visual indication representing the receiving phase on the display panel of the mobile phone when the intensity of the received voice signal is stronger than that of the transmitted voice signal, and sending the transmitted voice signal to the caller while displaying a visual indication representing the transmitting phase on the display panel when the intensity of the received voice signal is weaker than that of the transmitted voice signal.

BRIEF DESCRIPTION OF THE ATTACHED DRAWINGS

Figure 1:
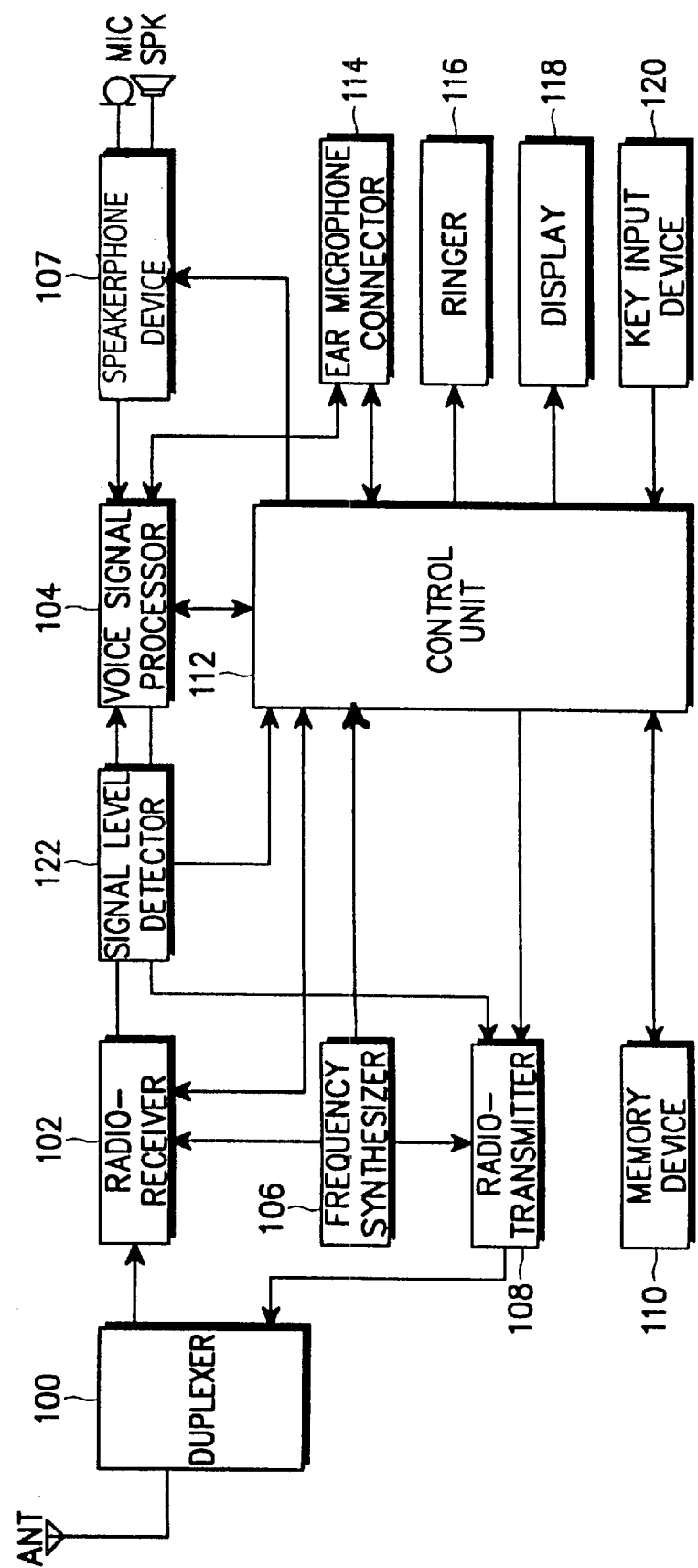
Figure 2A:
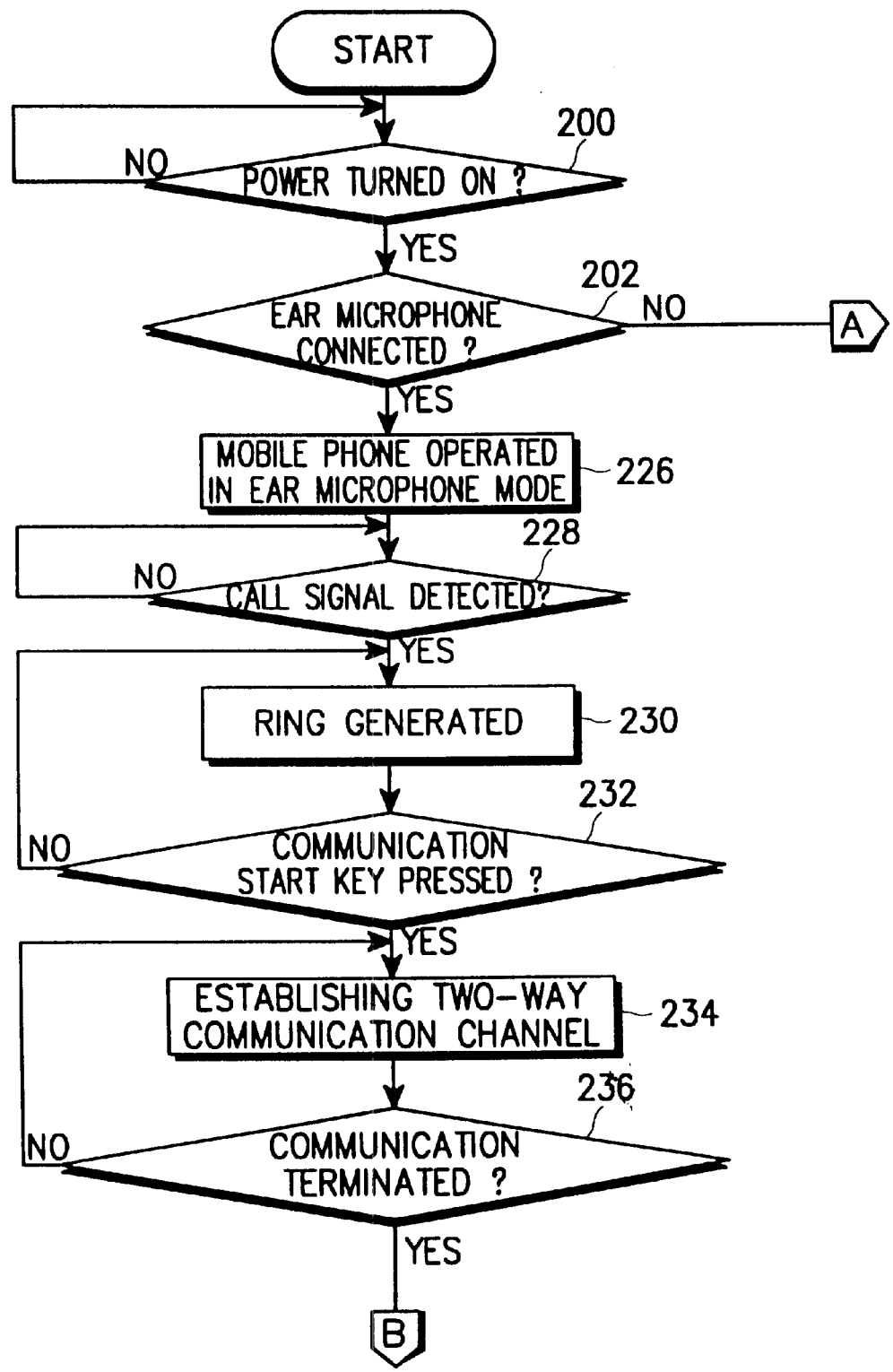
Figure 2B:
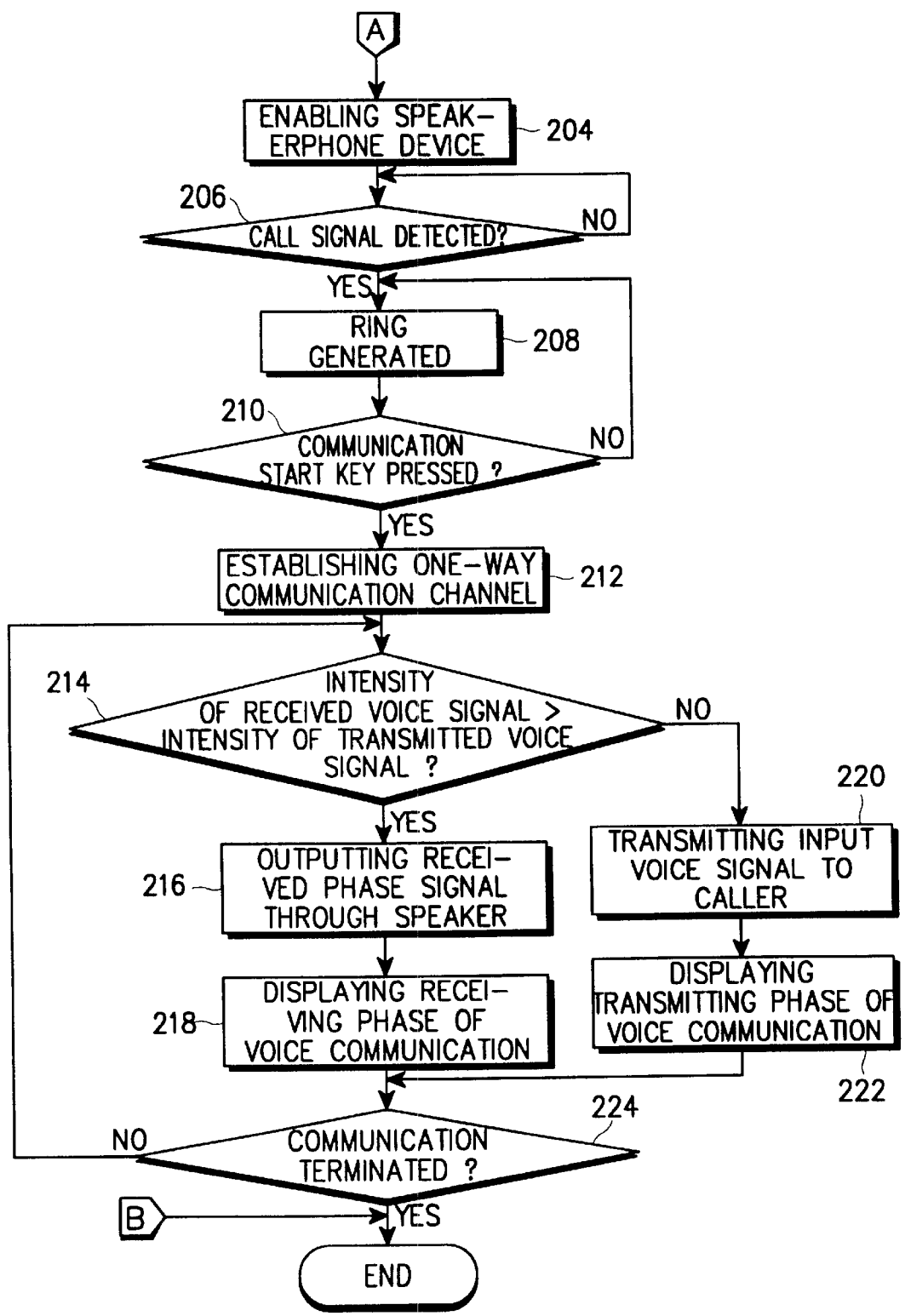
Figure 3A:
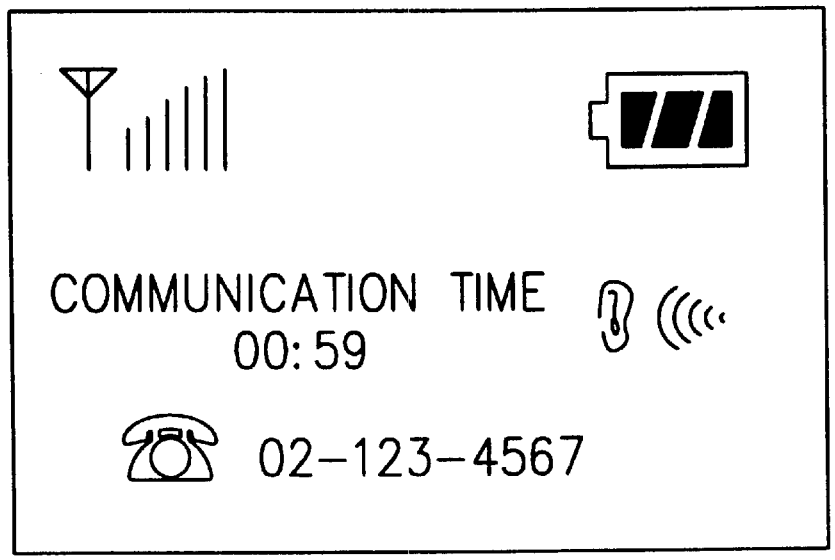
Figure 3B:
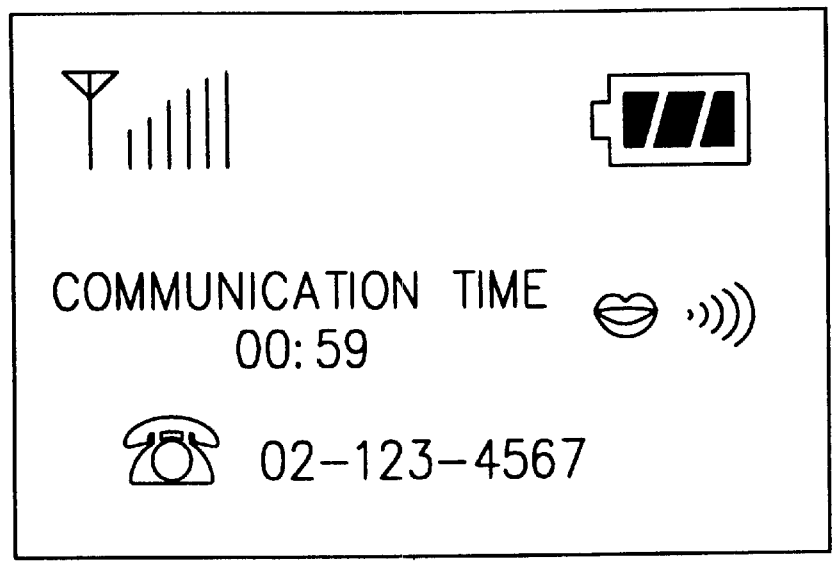

The above and other objects, features, and advantages of the present invention will become more apparent in light of the following detailed description of an exemplary embodiment thereof taken in conjunction with the attached drawings in which:

FIG. 1 is a block diagram illustrating the structure of a conventional mobile phone employing the present invention;

FIGS. 2A and 2B are flow charts which together illustrate the process of displaying the alternating transmitting and receiving phases of voice communication in a mobile phone in speakerphone mode according to an embodiment of the present invention; and FIGS. 3A and 3B are an example of a visual indication displaying the alternating transmitting and receiving phases of voice communication according to an embodiment of the present invention.

DETAILED DESCRIPTION OF THE PREFERRED EMBODIMENT

In the detailed description which follows, commonly known functions or construction are not described in detail to avoid obscuring the invention in unnecessary detail. Turning now to the drawings, in which like reference numerals identify similar or identical elements throughout the several views, FIG. 1 illustrates the structure of a conventional mobile phone.

Referring to FIG. 1, the mobile phone is generally controlled by a control unit 112. A duplexer 100 operates to transfer the radio signals received through the antenna ANT to a radio receiver 102, and to output radio signals received from a radio transmitter 108 through the antenna. The radio receiver 102 transfers the received data signals to the control unit 112, and the voice signals to a voice signal processor 104 through a signal level detector 122. A frequency synthesizer 106 generates a carrier-remover signal delivered to the control unit 112 to remove the received carrier signal, and a transmission-carrier signal delivered to the radio transmitter 108, which combines the voice signals from the voice signal processor 104 (delivered via the control unit 112) and the transmission-carrier signal from the frequency synthesizer 106 to generate the transmitted voice signal delivered to the duplexer 100.

The voice signal processor 104 demodulates the coded voice signal received from the radio receiver 102 through the signal level detector 122 to generate the received voice signal through a speakerphone device 107 to the speaker SPK, and encodes the voice signal received from the microphone MIC through the speakerphone device 107 to generate the transmitted voice signal delivered to the radio transmitter 108. The signal level detector 122 detects the intensities of the received and transmitted voice signals delivered to the control unit 112. A ringer 116 generates a ring upon receiving a ring signal. A memory device 110 includes a ROM for storing a control program executed by the control unit 112, a non-volatile memory for storing a plurality of phone numbers and names, and an RAM for storing the temporary data generated during execution of the control program. A key input device 120 comprises a plurality of keys such as communication start and end keys and dialing keys to generate key input data which is input by the control unit 112. A display 118, preferably an LCD, is provided to display the various characters and icons representing the working states of the mobile phone under the control of the control unit 112.

Referring to FIG. 2, according to the control program stored in the memory device 110, when the power is turned on in step 200, the control unit 112 detects whether an ear microphone is connected via the ear microphone connector 114 in step 202. The ear microphone consists of an earphone with a microphone connected to the earphone line so as to provide two-way communication, and is usually included in the conventional hands-free kit for a vehicle. In this case, if the ear microphone is connected to the ear microphone connector 114, the control unit 112 enables the mobile phone to work in the ear microphone mode in step 226. In this mode, the control unit 112 transfers the voice signal inputted through the ear microphone to the voice signal processor 104. Then, detecting a call signal in step 228, the controller 112 enables the ringer 116 to generate a ring in step 230. Subsequently, if the user presses the communication start key provided in the key input device 120, the control unit 112 establishes a two-way communication channel between the caller and the mobile phone in step 234. Thereafter, detecting the input of the communication end key in step 236, the control unit 112 terminates the communication established between the caller and the mobile phone.

Alternatively, if no ear microphone is detected in step 202, the mobile phone enters a speakerphone mode in step 204, enabling the speakerphone device 107. Thereafter, upon detecting a call signal in step 206, the control unit 112 enables the ringer 116 to generate a ring in step 208. Accordingly, if the user presses the communication start key provided in the key input device 120, the control unit 112 establishes a one-way communication channel for the speakerphone mode between the caller and the mobile phone user in step 212. Then, upon receiving the output of the signal level detector 122, the control unit 112 compares the intensity of the transmitted voice signal of the mobile phone with that of the received voice signal from the caller in step 214. If the intensity of the received voice signal is stronger than that of the transmitted voice signal, the control unit 112 outputs the received voice signal through the speaker SPK of the speakerphone device 107 in step 216. Then, the control unit 112 enables the display 118 to display a visual indication representing that the receiving phase of the voice communication is active through the one-way communication channel in step 218, as shown in FIG. 3A, where an icon representing an ear is shown indicating the receiving phase.

Alternatively, if the intensity of the received voice signal is weaker than that of the transmitted voice signal in step 214, the control unit 112 transmits the voice signal inputted through the microphone MIC of the speakerphone device 107 to the caller in step 220. Then, the control unit 112 enables the display 118 to display a visual indication representing that the transmitting phase of the voice communication is active through the one-way communication channel in step 222, as shown in FIG. 3B, where an icon representing a mouth is shown indicating the transmitting phase.

Finally, detecting the input of the communication end key in step 224, the control unit 112 terminates the communication channel established between the caller and the mobile phone. Thus, the user of the mobile phone may be assured by viewing the icon displayed whether the mobile phone is presently receiving or transmitting the voice signal from or to the caller. Of course, the icons representing the ear and mouth may be replaced by any appropriate visual indicators which would respectively indicate the receiving and the transmitting phase.

While the present invention has been described in connection with specific embodiments accompanied by the attached drawings, it will be readily apparent to those skilled in the art that various changes and modifications may be made thereto without departing from the scope and spirit of the present invention as defined by the appended claims.

What is claimed is:

1. A method of displaying visual indication of alternating transmitting and receiving phases of voice communication on a display for a mobile phone when it is operated in a speakerphone mode, comprising the steps of:

comparing an intensity of a received voice signal from a caller with an intensity of a transmitted voice signal;

outputting said received voice signal through a speaker of said mobile phone while displaying a visual indication representing the receiving phase on the display if the intensity of said received voice signal is stronger than the intensity of said transmitted voice signal; and sending said transmitted voice signal to said caller while displaying a visual indication representing the transmitting phase on the display if the intensity of said received voice signal is weaker than the intensity of said transmitted voice signal.

2. The method recited in claim 1, wherein the visual indications representing said receiving and transmitting phases are displayed as respective icons.

3. The method recited in claim 1, wherein the visual indications representing said receiving and transmitting phases are displayed as respective sets of characters.

* * * * *